United States Patent
Weitz

[11] 3,876,326
[45] Apr. 8, 1975

[54] SURGE CONTROL SYSTEM
[75] Inventor: Paul G. Weitz, Salisbury, Vt.
[73] Assignee: Simmonds Precision Products, Inc., Tarrytown, N.Y.
[22] Filed: Jan. 30, 1974
[21] Appl. No.: 437,860

[52] U.S. Cl. .................. 415/17; 60/39.29; 415/1; 415/30
[51] Int. Cl. ............................................ F04d 27/02
[58] Field of Search ....... 60/39.29, 39.28 P; 415/17, 415/30, 1, 37, 38, 39; 73/136 A

[56] References Cited
UNITED STATES PATENTS

| | | | |
|---|---|---|---|
| 2,930,520 | 3/1960 | Abild | 415/17 |
| 2,978,166 | 4/1961 | Hahn | 415/17 |
| 2,985,243 | 5/1961 | Tyler et al. | 60/39.28 P |
| 3,106,062 | 10/1963 | Rosenberg et al. | 60/39.28 P |
| 3,292,845 | 12/1966 | Hens et al. | 415/17 |
| 3,292,846 | 12/1966 | Harper et al. | 415/17 |
| 3,538,762 | 11/1970 | Parkinson et al. | 73/136 A |
| 3,545,265 | 12/1970 | McIlreith et al. | 73/136 A |
| 3,604,255 | 9/1971 | Bart | 73/136 A |

Primary Examiner—C. J. Husar
Assistant Examiner—O. T. Sessions
Attorney, Agent, or Firm—Edwin E. Greigg

[57] ABSTRACT

The invention relates to a system for protecting axial and centrifugal compressors from surge. The torque and speed are continuously monitored by a non-contacting sensor system including three equi-spaced gears, two of which are mounted on a reference sleeve which is mounted on the shaft of the compressor at a position spaced from the third gear. Relative movement of the three gears is monitored by sensors which through appropriate circuitry produce signals directly related to shaft horsepower and to speed. Comparison with a reference signal indicates whether the compressor is approaching surge conditions and if so, anti-surge measures such as the opening of bleed valves are taken.

5 Claims, 10 Drawing Figures

100
SURGE CONTROL SYSTEM

BACKGROUND OF THE INVENTION

1. Field of the Invention

This invention relates to a surge control system for centrifugal and axial flow compressors for use, for example, in natural gas pipelines.

2. Description of the Prior Art

It is well known in the compressor art that under certain operational conditions both centrifugal and axial flow compressors operate in an unstable manner known as "surge". Basically surge occurs when the flow over the individual blades of the compressor becomes "stalled" in much the same manner as the aerofoil of an aircraft when the angle of incidence to the air flow is too high in relation to the mass flow.

Although centrifugal compressors will recover and operate normally once the conditions giving rise to stall have been removed, the same is not true for axial compressors and for both types operation under surge conditions is not only highly dangerous from the viewpoint of overstressing components of the compressor blades and rotor but in addition when the compressor is employed in a natural or other gas pipeline shock waves can be produced which give rise to surging flow in the pipeline and this will lead to adverse effects on consuming devices.

Various systems for controlling surge have been proposed previously and it is well known that surge can be cured by opening bleed valves at an intermediate stage of the compressor. Other devices for curing surge are also known and these are generally satisfactory, but previously proposed systems for controlling the opening of the bleed valves are less satisfactory particularly where these involve constant monitoring of gas flow rates at the inlet and outlet of the compressor. In one such system inlet gas flow rate is measured using a calibrated nozzle while shaft speed and inlet gas conditions such as temperature are also measured and using these values, the operating point of the compressor is established by a computer and, if the operating point proves to be closer than a given safety margin from the surge line remedial steps such as opening bleed valves are put into operation. This previously proposed system has the disadvantage that the measurements taken involve the use of delicate instruments and particularly where the compressor is being operated at an unmanned station, any failure on the part of the monitoring apparatus could result in destruction of or at least damage to the compressor installation.

It is accordingly an object of the present invention to provide a surge control system for centrifugal and axial flow compressors which meet the requirements of practice more satisfactorily than previously proposed systems.

It is a further object of the present invention to provide a surge control system for centrifugal and axial flow compressors in which measurements taken to monitor the operating parameters of the compressor do not require physical contact of any part of the measuring equipment with any rotating part of the compressor installation.

SUMMARY OF THE INVENTION

According to the present invention there is provided in a compressor anti-surge system, a compressor shaft, a compressor mounted on the shaft, surge-relief means of the compressor, means for sensing the angular deflection of the shaft when under load and for sensing the rotational speed of the shaft, circuitry connected to the sensing means and serving to produce output signals directly related to shaft horsepower and shaft speed, means for measuring inlet and outlet parameters of the gas flow, a computer comprising a store carrying operational information of said compressor, said computer being connected to receive signals from said circuitry and from said inlet and outlet parameter-measuring means whereby to calculate the speed corrected for inlet conditions and the mass flow corrected for inlet conditions, and, to compare the resultant calculated values and the horsepower signal with corresponding values in the store, the comparison serving to produce a change in the output of the computer if the calculated values indicate approach to surge conditions, and servo means operable to actuate the surge-relief means, said servo means being connected to the output of the computer whereby the servo means are actuated by said change in output.

DESCRIPTION OF THE PREFERRED EMBODIMENT

Figure 1:
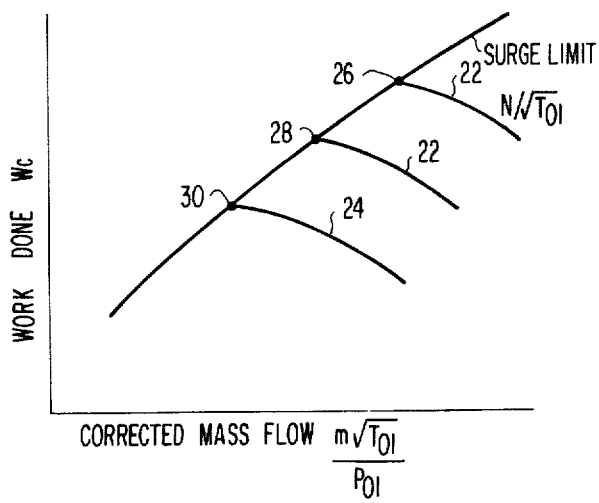
FIG. 1 is a graph showing the surge limit line for a centrifugal gas compressor in which work done by the compressor per pound of gas compressed is plotted against gas mass flow per unit time corrected for inlet conditions.

In order to make the invention fully clear, the underlying theory will first be discussed. Referring to FIG. 1 a centrifugal natural-gas compressor has performance characteristics at various speeds N corrected for gas inlet temperature $T_{01}$ indicated by the lines 20, 22, and 24. The ordinate Wc represents the work done by the compressor per pound of gas compressed and this is also equal to the total head developed, or in other words the pressure rise developed by the compressor. The units of Wc may be BTU/LB., HP/LB., feet of fluid; or pounds per square inch.

The abscissa represents the mass flow per unit time corrected for inlet conditions, where m is the actual mass of gas flowing; $T_{01}$ is the temperature at inlet and $P_{01}$ is the pressure at inlet. The points 26, 28 and 30 are the points for the speeds represented by the lines 20, 22 and 24 respectively at which the compressor will surge.

The characteristics illustrated in FIG. 1 can be plotted for any particular compressor by well known techniques.

Having determined the surge points, the horsepower of the compressor at these points can be calculated from the extression:

H$P$ = ($Wc$) (mass flow).

Figure 2:
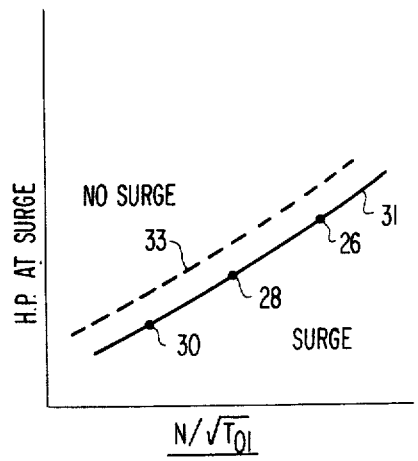
FIG. 2 is a graph plotting horsepower at surge against compressor speed in rpm corrected for inlet conditions.

FIG. 2 illustrates the surge line 31 developed from these calculations, the horsepower at surge being represented as before by the three points 26, 28 and 30. Calculations to produce this curve apply only to a particular gas composition since for varying compositions the ratio of the specific heats will also vary. To avoid surge preventative action must be taken when the broken line 33 is reached. This line 33 is arbitrary but will be based on experience with the system to ensure that the time allowed for corrective action is adequate while nevertheless avoiding premature and wasteful blow-off action.

It follows from this theory that if action is taken when the surge horsepower is approached, actual surge can be avoided by operation conventional bleed valves in the compressor casing or any other surge-relief device.

It can be shown from compressor theory, all of which is well known to persons skilled in the art, that if the shaft horsepower and the work per pound of fluid is known the gas flow can be calculated from the formula
$G$ = Power/$Wc$.

By measuring the inlet and outlet gas temperatures or pressures and knowing the specific heat at constant pressure and the ratio of specific heats for the gas being pumped, the value Wc can be calculated electronically. Thus, with this information, the required surge control procedure can be initiated without the requirement of previously proposed systems of a calibrated nozzle which is generally unsatisfactory under industrial conditions.

Apparatus for monitoring on a continuous basis the shaft horsepower supplied to a compressor is illustrated in FIGS. 3 to 6 of the accompanying drawings. The system employed does not call for rubbing or any other physical contact with the shaft thus avoiding the risk of false readings which contact may occasion and also avoiding the wear inherent in any contact system.

Figure 3:
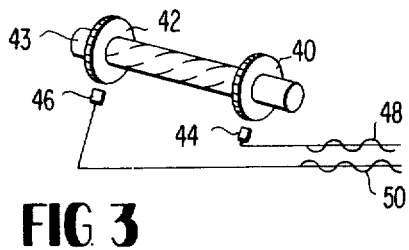
FIG. 3 shows diagrammatically a simple torque measuring device.

A very simple form of non-contact torque measurement device is illustrated in FIG. 3 and includes gear wheels 40, 42, spaced apart on a shaft 43. Torque transmitted by the shaft will result in angular deflection of the shaft and hence an angular displacement will occur between the wheels 40, 42 and this displacement is directly linearly related to the shaft torque at any instant. The device further includes two variable reluctance pick-ups 44, 46 immediately adjacent respective gear wheels and the two electrical waveforms 48, 50 produced by the pick-ups have frequencies directly related to shaft speed and the phase shift (shown much exaggerated) of the waveforms 48, 50 is directly related to the shaft torque.

In practice the use of separate, single-pole sensors as in FIG. 3 is of limited value and frequently inconvenient. Thermal growth may also affect the accuracy of the measurements taken and in a development of the device of FIG. 3 a reference sleeve 52 is mounted concentrically with the shaft adjacent one end while the corresponding gear wheel 54, is mounted on the reference sleeve 52 immediately adjacent to the other gear wheel 56. It follows that the variable reluctance pick-ups 44, 46 can readily be placed in a single housing 59 (broken lines).

Figure 4:
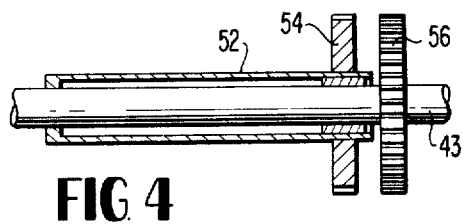
FIG. 4 is a diagram illustrating a modification of the torque-measuring device of FIG. 3.
Figure 5A:
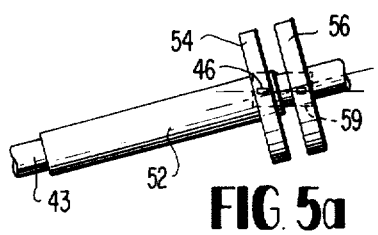
FIGS. 5a and 5b illustrate a defect of the torque measuring device of FIG. 4.
Figure 5B:
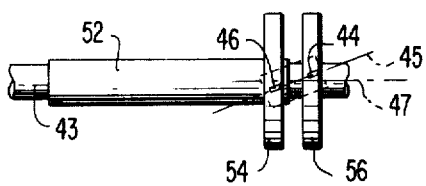

FIGS. 5$a$ and 5$b$ illustrate that the system of FIG. 4 also has drawbacks since any change in alignment between the sensor center line 45 and the shaft center line 47 will give rise to apparent change in the phase hence giving a false torque reading. In FIG. 5$a$ the shaft is misaligned, whereas in FIG. 5$b$ the sensors are misaligned — in both Figs. the misalignment is shown considerably exaggerated.

Figure 6A:
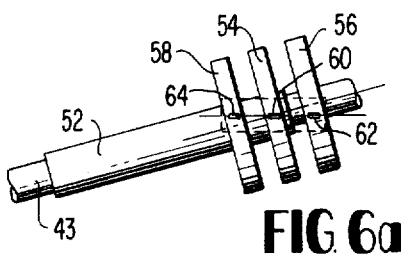
FIGS. 6a and 6b illustrate a modification which fully corrects the defect of the torque-measuring device of FIG. 4.
Figure 6B:
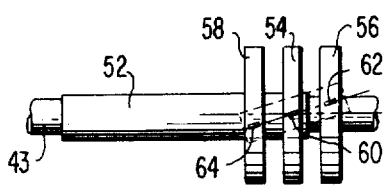

To eliminated the difficulties, a second gear wheel 58, is mounted on the reference sleeve 52 thus providing an assembly of three equally axially spaced gear wheels. This second gear wheel 58 is termed herein a "position" gear and is permanently fixed in relation to the central, reference gear 54. It will be apparent that a change in the phase relationship between the reference and the position sensor signals delivered by the variable reluctance pick-ups 60, 64 will only arise if there is a change in the alignment between the sensor and the shaft as is illustrated in FIGS. 6$a$ and 6$b$ in highly exaggerated form. FIG. 6$a$ shows the shaft misaligned and FIG. 6$b$ shows the sensors misaligned. Owing to the equal spacing of the gear wheel arrangement an equal but opposite phase shift will be created between the reference gear wheel 54 and the torque gear wheel 56 producing sensor signals of opposite phase shift to those produced by the wheel 58 thus exactly cancelling out the error.

It follows that the three gear wheel arrangement is fully compensated for changes in shaft or sensor alignment and recalibration required for slight errors in alignment of the reference sleeve 52 and the shaft 43 can be avoided.

Figure 7:
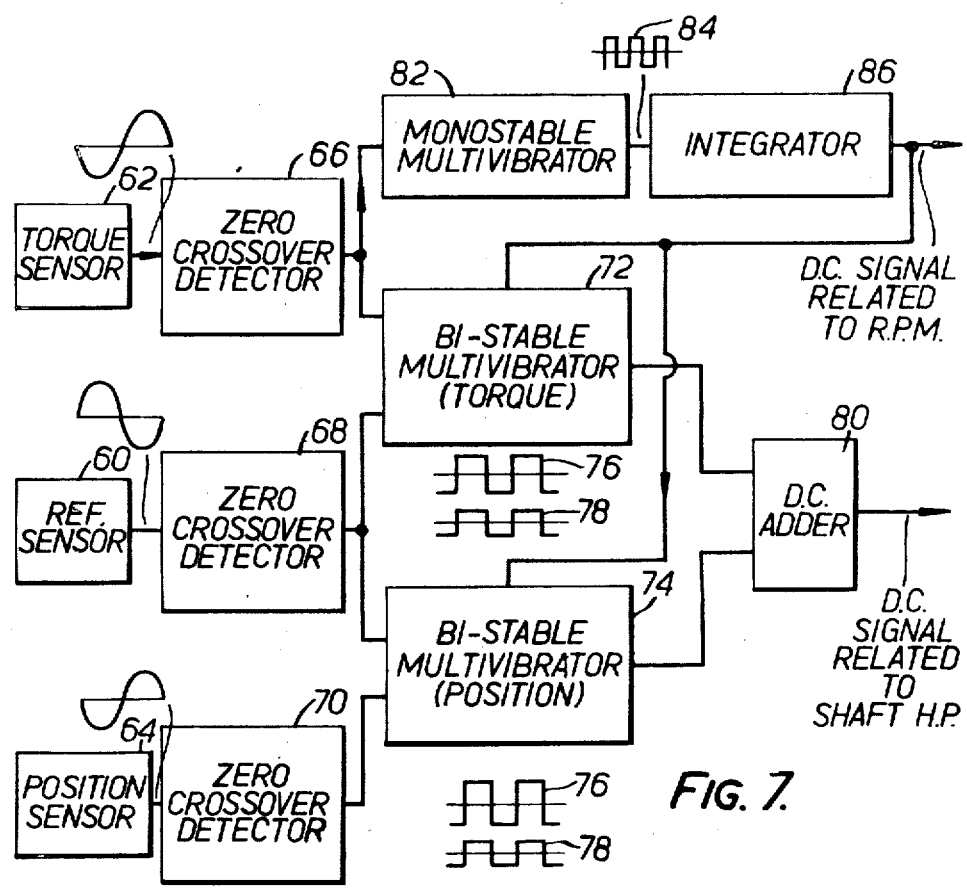
FIG. 7 illustrates a circuit which serves to produce a signal from the torque-measuring device of FIGS. 6a and 6b which is related to the horsepower being transmitted by the compressor shaft.

FIG. 7 illustrates a circuit diagram for producing a signal directly related to the instantaneous shaft horsepower. The signals (indicated on the Figure) from the three sensors 60, 62, 64 are supplied to three zero-crossover detectors 66, 68, 70 which in turn feed two bi-stable multi-vibrators 72, 74. In both multi-vibrators 72, 74 the reference pulse, that is from the center zero-crossover detector 68 switches the output of the multi-vibrator "on".

The torque and position pulses switch the respective multi-vibrators 72, 74 off and as a result two rectangular waveforms 76, 78 are produced whose ratio of on time to period time is directly related to shaft torque and position. Each multi-vibrator also receives a signal related to shaft speed and so the final output signals are related to shaft horsepower.

As illustrated in FIG. 7 waveform 76 represents the multi-vibrator outputs for a nominal shaft and sensor alignment while waveform 78 represents a misaligned shaft condition. The summation of the average DC content of the waveforms is carried out in a DC adder 80 which provides the same output voltage and hence a DC voltage directly related to shaft horsepower is produced and is unaffected by changes in sensor-to-shaft relationship.

In order continuously to monitor the shaft speed, an output pulse from one of the zero-crossover detectors 66 in the torque-measuring circuit is supplied to a further, monostable, multi-vibrator 82 and this can be triggered to produce a fixed pulse width output waveform 84 with a repetition rate identical to that of the incoming sensor signal. The average DC content of this rectangular waveform which is produced in an integrator 86 of known form is directly related to shaft rotational speed and this signal is fed to each of the bi-stable multi-vibrators to provide a DC clamp.

Figure 8:
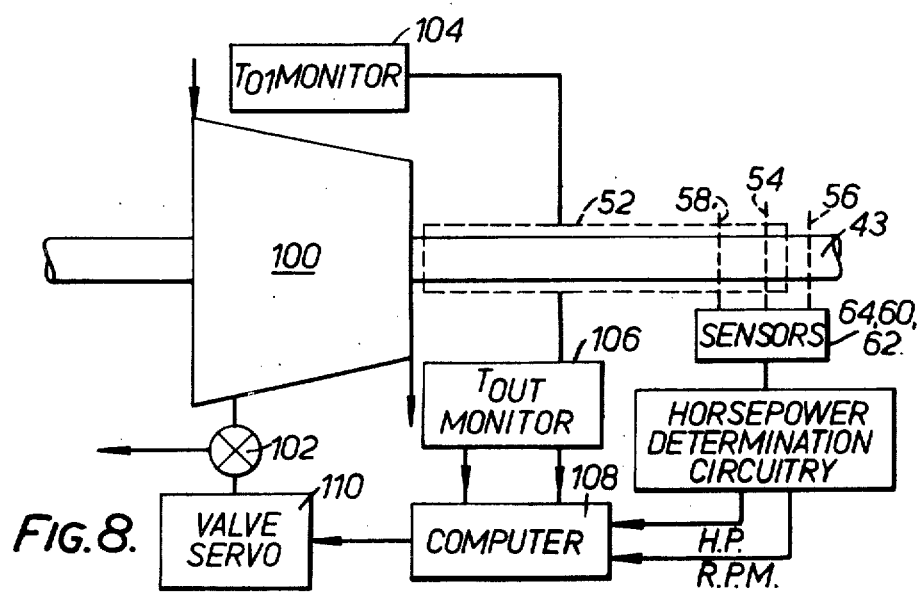
FIG. 8 is a block diagram showing a circuit of an embodiment of a compressor surge preventing system in accordance with the invention.

Referring now to FIG. 8, the system of surge-prevention, as a whole, includes the compressor 100 and blow-off valves indicated purely diagrammatically at 102. A monitor 104 measures temperature at inlet and a monitor 106 measures temperature at outlet and signals from these monitors and from the circuits of FIG. 7 are supplied to a computer 108 which serves to calculate the value $N\sqrt{T_{01}}$ and the corrected mass flow and also to compare the value of horsepower and mass flow with the corrected speed $N\sqrt{T_{01}}$ with the corresponding reference values held in the computer store for the particular compressor and gas. So long as the conditions indicate that safe operation of the compressor is continuing, no further action is taken, but once the difference between the actual operational parameters produced and the error margin signal is reduced to zero, anti-surge action is taken by opening the bleed valves 102 through a valve servo 110. Once the indication of approaching surge conditions has been cancelled, the servo 110 operates to shut the bleed valves 102 and normal monitoring continues.

What is claimed is:

1. In a compressor anti-surge system,
   a compressor shaft,
   a compressor mounted on the shaft,
   surge-relief means of the compressor,
   means for sensing the angular deflection of the shaft when under load and for sensing the rotational speed of the shaft,
   circuitry connected to the sensing means and serving to produce output signals directly related to shaft horsepower and shaft speed,
   means for measuring inlet and outlet parameters of the gas flow,
   a computer comprising a store carrying operational information of said compressor, said computer being connected to receive signals from said circuitry and from said inlet and outlet parameter-measuring means whereby to calculate the speed corrected for inlet conditions and the mass flow corrected for inlet conditions, and, to compare the resultant calculated values and the horsepower signal with corresponding values in the store, the comparison serving to produce a change in the output of the computer of the calculated values indicate approach to surge conditions, and
   servo means operable to actuate the surge-relief means, said servo-means being connected to the output of the computer whereby the servo means are actuated by said change in output.

2. A system according to claim 1, wherein said surge-relief means comprises at least one blow-off valve.

3. A system according to claim 1, wherein said means for sensing angular deflection includes
   a first gear wheel mounted on the compressor shaft,
   a sleeve rigidly mounted on the shaft at a position remote from the first gear wheel and co-axial with the shaft,
   a second gear wheel rigidly mounted on the sleeve adjacent the first gear wheel, and
   a third wheel mounted on the sleeve at a position opposite to that of the first gear wheel, all three gear wheels being axially spaced, and
   sensor means serving to sense relative angular positional displacement of the wheels relative to the anohter.

4. A system according to claim 3, wherein said circuitry connected to the sensing means comprises
   a first zero-crossover detector connected to receive signals from the sensor means of the first gear wheel,
   a second zero-crossover detector connected to receive signals from the sensor means of the second gear wheel,
   a third zero-crossover detector connected to receive signals from the sensor means of the third gear wheel,
   a first bi-stable multi-vibrator connected to receive output signals of the first and second zero-crossover detectors,
   a second bi-stable multi-vibrator connected to receive output signals of the second and third zero-crossover detectors,
   a monostable multi-vibrator connected to receive a signal from one of said zero-crossover detectors,
   an integrating circuit connected to receive the output signal of the monostable multi-vibrator and to produce an output signal directly related to shaft speed and connected to feed said output signal to each of said bi-stable multi-vibrators, and
   addition circuitry connected to receive the outputs of said bi-stable multi-vibrators and producing a signal directly related to shaft horsepower.

5. A system according to claim 3 wherein said sensing means comprises
   a first variable reluctance sensor disposed adjacent the first gear wheel,
   a second variable reluctance sensor disposed adjacent to the second gear wheel, and
   a third variable reluctance sensor disposed adjacent the third gear wheel.

* * * * *